United States Patent [19]

Auslander et al.

[11] Patent Number: 5,288,316
[45] Date of Patent: Feb. 22, 1994

[54] NON AQUEOUS DISPERSION INK WITH IMPROVED SHELF LIFE, TACK AND FLOW

[75] Inventors: Judith D. Auslander, Westport, Conn.; Norman C. Hochwalt, West Carrollton, Ohio

[73] Assignee: Pitney Bowes Inc., Stamford, Conn.

[21] Appl. No.: 956,209

[22] Filed: Oct. 5, 1992

[51] Int. Cl.$^5$ .............................. C09D 11/08
[52] U.S. Cl. .................. 106/27 R; 106/28 R; 106/30 R
[58] Field of Search ............... 106/20 R, 27 R, 28 R, 106/30 R

[56] References Cited

U.S. PATENT DOCUMENTS

| | | | |
|---|---|---|---|
| 2,970,965 | 2/1961 | Switzer | 252/301.35 |
| 3,928,226 | 12/1975 | McDonough et al. | 252/301.35 |
| 4,361,843 | 11/1982 | Cooke et al. | 106/27 R |
| 4,386,961 | 6/1983 | Lin | 106/27 R |
| 4,400,215 | 8/1983 | Cooke et al. | 106/27 R |
| 4,531,976 | 7/1985 | Lin | 106/27 R |
| 4,767,459 | 8/1988 | Greenwood et al. | 106/22 K |
| 4,793,264 | 12/1988 | Lin et al. | 106/27 R |
| 4,822,418 | 4/1989 | Lin et al. | 106/27 R |
| 5,114,478 | 5/1992 | Auslander et al. | 106/20 R |

Primary Examiner—Helene Klemanski
Attorney, Agent, or Firm—Peter Vrahotes; Melvin J. Scolnick

[57] ABSTRACT

Ink formulations have been conceived that result in inks having improved shelf life, tack and flow properties so that problems relating to ink plugging with contemporary ink pads are reduced. Another advantage of the inks is that they have improved paper dust resistance. These inks are made of a coloring material having an organic pigment dispersed in a modified rosin ester or dispersed in a modified rosin ester and triazine formaldehyde aryl sulphonamide resin dispersed in an alkyd oil. The solvent system is preferably composed of non drying solvents such as emollients and high molecular weight glycols.

17 Claims, No Drawings

NON AQUEOUS DISPERSION INK WITH IMPROVED SHELF LIFE, TACK AND FLOW

BACKGROUND OF THE INVENTION

Great demands have been made upon printing systems and materials therefor in light of the need of faster printing, in conjunction with the computer age, and the seeking of lower toxicity to comply with governmental environmental regulations. In high speed printing, a problem has been encountered with paper dust which is generated during paper transport and the impact of a printing element on the paper. This is particularly true of the printing on envelopes which are made of paper with loose fibers.

One of the components of the printing system that has required extensive modification is the ink. In most printing applications, a pad or roller made of a porous material is supplied with ink for the purpose of transferring the ink to a printhead. The printing pad may be one which is self contained or it may be one that is periodically supplied with ink from a reservoir. The problems in producing a satisfactory fluorescent ink are compounded because a plurality of dyes and pigments are required for achieving good color, fill in, edge acuity and the other qualities required from an ink. One of the major problems associated with inks is aging which results in printing that has a change in color and intensity with the passing of the time the ink is stored. An ink that overcomes the aging problem and shows low environmental sensitivity (high humidity and low and high temperatures), low tackiness and flow properties, material compatibility and paper dust resistance would be advantageous. Another consideration is that the ink pad must function in an open environment without drying for at least six months; therefore, the ink solvents should be non volatile.

SUMMARY OF THE INVENTION

Non aqueous dispersion ink formulations have been discovered that are nontoxic and have flow properties which substantially reduce the tendency of the ink to cause plugging in an inking pad. Ink pad life has a variability caused mainly by the inherent properties of the ink with which it is used. The inking pad may be assembled with two layers of foam, the first layer serving as an ink reservoir layer and the second layer serving as a metering layer which contacts the print head. Because of its high density and smaller pore size, the metering layer can act as a filter as a consequence of the ink concentrating at the interface of the two layers. As a result, plugging tends to occur. Of course, what is meant by plugging is the fact that particles of the ink are captured within the pores of the inking member and thus prevent the flow of ink.

It has been found that the plugging onset can be delayed with the ink formulations of the instant invention because of decreased dissolved resin concentration, thereby decreasing the viscosity, even though the size of the pigments can vary from $0.1\mu$ to $0.5\mu$.

The ink formulation of the instant invention is based on organic pigments dispersed in rosin esters or a combination of organic pigments dispersed in rosin esters and amino formaldehyde resin dispersed in an alkyd resin. The resulting color of these inks can be red, blue, green or black. It has been found that these ink formulations reduce the effects of paper dust accumulations because the solvents of the instant ink formulations are non drying on the printing elements and maintains printing elements in a wet state. Preferably the solvent has emollient properties. This wet state causes the flushing of elements resulting in paper dust being carried away. Lower concentrations of dissolved resin produces a lower tack ink which results in less paper dust attraction in the ink.

The ink formulations of the instant invention have low environmental sensitivity due to small variation of the viscosity in the operating temperature range of 5° to 45° C. and the low hygroscopicity of the solvents.

The preferred embodiment of the invention is the inclusion of an emollient solvent in the ink formulation. Use of this type of solvent has been found to be compatible with the pigments used to produce the ink, provides low toxicity, ease of fabrication of the ink, is inert to materials in the inking system and provides a non-drying ink. Another advantage to the inclusion of an emollient solvent is that it is non-volatile and consequently results in the inking pad not drying.

DETAILED DESCRIPTION OF THE PREFERRED EMBODIMENT

The formulations of the instant invention provide inks with improved print quality, are inert to materials used in a printer such as inker foams and rubber, low tack, good shelf life stability, and good flow through porous foam materials.

It has been found that the inks of the instant invention have an acceptable shelf life. The aged samples show no settling after two weeks of accelerated testing. The aging of the inks by temperature shock shows no settling for the inks during two weeks of accelerated testing that simulated one year-of aging by varying the temperature between 70° C. to −2° C., every four hours of the working day.

The dual inker foam described above that is used in high speed flat bed systems is made of a polychloroprene foam bottom layer. The top layer is made of polyethylene sintered foam. The rubber used in the printing elements is made of polybutadiene acrylonitrile rubber, which is plasticized with dibutyl phthalate. The solvents used in the instant ink formulations are inert to all these materials. The print head should be usable for ten million prints, or ten years, and the pad materials should be compatible with the inks for six months.

The pigment dispersion used in the ink formulation is stabilized by using easily dispersible pigments predispersed in a vehicle such as a rosin ester carrier, soy bean oil alkyds, non-ionic surfactants and other type of alkyds. An example of such a pigment dispersion is triazine aryl sulphonamide paraformaldehyde resin dispersed in linseed oil alkyd raisin. The non aqueous pigment dispersion used in the ink formulation is stabilized by using easily dispersible non fluorescent organic pigments predispersed in a vehicle such as rosin ester carrier, linseed oil alkyds, or other type of alkyds. The rosin ester dispersants are preferable because of the wide range of compatibility with solvents and resins. The non-fluorescent pigments also can be predispersed in a non-ionic surfactant such as oleyl alcohol ethoxylate and the like.

The solvent system is preferably of the emollient solvent type. The solvent system can be composed of a mixture of low molecular weight polypropylene glycol, 10 to 30%, polyoxypropylene stearyl ether (the emollient solvent), 70 to 90%, and nonyl phenoxy polyoxyethylene ethanol, up to 0.5%. All percentages in this disclosure and the accompanying claims are in weight percent. Other solvents that can be used are polyoxypropylene (10) cetyl ether, castor oil, soy bean oil and oleic acid.

The pigment dispersion can be further stabilized with a neoalkoxy titanate coupling agent and emulsifiers such as nonyl phenoxy polyethoxylated alcohols, which emulsifiers have an HLB (hydrophylic lipophylic balance) value from 2 to 15. The solvent system is inert to the materials used in the printer, such as ink foams, print elements, pumps, tubing, print pads, and the like.

The formulation of the instant invention involves unique color combinations based on mixtures of organic pigments such as the phthalocyanines and results in strong colors with high purity. Other organic pigments that can be used are given in the General Composition table hereinafter.

The selection of the phthalocyanines for the blue ink is based on their dichroic properties. They reflect highly in the red region of the spectrum where the transmitted color is much greener.

The organic pigments such as the phthalocyanines can be used in different forms such as powder or chips or predispersed pigments in rosin esters and organic pigments flushed with non-ionic surfactants such as oleyl alcohol ethoxylates. The average particle size of the organic pigments is between 0.1 and 0.4μ for at least 98% of the particles.

Another component that may be included as an additive to the ink formulations is fumed silica with grafted polysiloxane groups. This additive controls the thioxtrophy of the ink, reduces surface tension and flattens the variation of the viscosity at different temperatures. At the same time, it reduces the hygroscopicity of the ink.

The present invention provides a new class of inks that are compatible with the polymeric materials used in contemporary printers. Examples of such inks are as follows:

General Composition

| Ingredients | Weight % |
|---|---|
| 1. Organic pigments (≈33%) predispersed in a rosin ester (≈67%) | 1–10% |
| a. C.I. Pigment Blue 15.1 or Blue 15.3 | |
| b. Red Lake C (Pigment Red 53:1) | |
| c. Pigment Red C.I. #144 | |
| d. Permanent Red (Pigment Red 48) | |
| e. Little Red (Pigment Red 49:1) | |
| f. Pigment Yellow C.I. #110 | |
| g. Pigment Brown C.I. #23 | |
| h. Pigment Green C.I. #7 | |
| i. Pigment Black C.I. #7 | |
| 2. Organic pigments (same as pigments 1a–1i above) (≈20%) flushed in a non-ionic surfactant (≈80%) (optional) | Up to 10% |
| a. Oleyl alcohol ethoxylate | |
| b. Fatty acid ester C12 to C14 | |
| 3. Non aqueous continuous phase | 40–90% |
| a. Stearyl polyoxypropylene ether | |
| b. Polyoxypropylene (10) cetyl ether | |
| c. Oleic acid | |
| d. Castor oil | |
| e. Soya bean oil | |
| f. Combination of 70% to 90% of 2a or 2b with 10–30% polypropylene glycol | |
| 4. Triazine aryl suphonamide paraformaldehyde resin (50%) dispersed in linseed oil | 5 to 20% |

General Composition -continued

| Ingredients | Weight % |
|---|---|
| alkyd resin (50%) (optional) | |
| 5. Low polarity emulsifier (optional) nonylphenoxypolyoxyethylene ethanol HLB value 2–4.9 | 1–5% |
| 6. Moderate polarity emulsifer (optional) nonylphenoxypolyoxyethylene ethanol HLB value 11–16 | 1.0 to 5.0% |
| 7. Surface tension modifier (optional) | |
| a. silicon glycol | 0.1 to 0.3% |
| b. fumed silica with grafted polysiloxane groups | 0.5% trace to 1% |
| 8. Coupling Agent (optional) titanante neoalkoxy | 0.2 to 1% |
| 9. Linseed oil alkyd (optional) | up to 10% |

It will be appreciated that the above are given by way of example only and one skilled in the art will recognize that other components having similar properties can be used in the practice of the invention.

| Ingredient | Manufacturer | Wt. % |
|---|---|---|
| Example I Red | | |
| Emollient Solvent | ICI | 52.46 |
| Polypropylene Glycol | BASF | 29 |
| Nonyl phenoxy polyoxyethylene ethanol and IGEPAL CO-530) | GAF | 4.6 |
| Titanate Coupling Agent | Kenrich | 0.34 |
| MICROLITH RED (BRT) | Ciba Geigy | 2.6 |
| Red Lake C Flushed in Soya Bean Alkyd | Hilton Davis | 3.0 |
| Pigment 52.1 in non-ionic surfactant | Penn Color-Amerchol | 2.0 |
| Red Lake C in non-ionic surfactant (AMEROXOL) | Penn Color-Amerchol | 6.0 |
| Properties | | |
| 1. Hunter Lab 45 ± 2; a. 50 ± 2, b. 22 ± 1.5 | | |
| 2. Viscosity at 0.5 sec$^{-1}$ = 500 cps and at 500 sec$^{-1}$ = cps | | |
| Example II | | |
| Organic Pigment (Microlith Red BRT) | CIBA GEIGY | 12.5 |
| Polypropylene Glycol (Pluracol P-410) | BASF | 28.0 |
| Emollient Solvent (Arlamol E) | ICI | 49.3 |
| Nonyl phenoxy polyoxyethylene ethanol (Igepal CO-210) | GAF | 2.3 |
| Nonyl phenoxy polyoxyethylene ethanol (Igepal CO-530) | GAF | 2.3 |
| Alkyd resin (TRIONOL) | Lawter Int. | 5.2 |
| Titanate Coupling Agent (Lica 38) | Kenrich | 0.4 |
| Properties | | |
| 1. Hunter Lab Color parameters L 50.893; a 45.73; b 14.74 | | |
| 2. Viscosity at D = 500 sec$^{-1}$ is .2 Pa.s. | | |
| Example III | | |
| Organic Pigment | BASF | 10.5 |
| Organic Pigment | BASF | 4.5 |
| Emollient Solvent (Arlamol E) | ICI | 47.9 |
| Polypropylene Glycol (Pluracol P-410) | BASF | 27.2 |
| Nonyl phenoxy polyoxyethylene ethanol (Igepal CO-210) | GAF | 2.2 |
| Nonyl phenoxy polyoxyethylene ethanol (IGEPAL CO-530) | GAF | 2.2 |
| Titanate Coupling Agent (Lica 38) | Kenrich | .4 |
| Alkyd resin (Trionol 3) | Lawter | 5.1 |
| Example IV - Red Ink | | |

-continued

| Ingredient | Manufacturer | Wt. % |
|---|---|---|
| Organic Pigment (Microlith Red BRT) | CIBA GEIGY | 3.0 |
| Organic Pigment (RED LAKE (Pigment red) in Rosin Ester) | Hilton Davis | 5.0 |
| Organic Pigment (Red Lake C in Ameroxol OE-5) | Penn Color | 4.0 |
| Organic Pigment (Pigment 52:1 in AMEROXOL OE-5) | Penn Color | 2.0 |
| Fumed Silica with Grafted Polysiloxane Groups | Cabot | 0.5 |
| Emollient Solvent (Arlamol E) | ICI | 51.5 |
| Polypropylene Glycol (Pluracol P-410) | BASF | 28.9 |
| Nonyl phenoxy polyoxyethylene ethanol (Igepal CO-210) | GAF | 2.3 |
| Nonyl phenoxy polyoxyethylene ethanol (Igepal CO-530) | GAF | 2.3 |
| Titanate Coupling Agent | Kenrich | .3 |

Properties
1. Hunter Color Lab parameters L 50.27; a 48.37; b 14.21
2. Flow properties:
Yield stress .89 Pa
Plastic viscosity .120 Pa.s
Viscosity at D-500 sec$^{-1}$ is .159 Pa.s
3. FOG on 0 to 5 mil Nil
4. Average particle size of the dispersion is .26μ.

Example V - Blue Ink

| Ingredient | Manufacturer | Wt. % |
|---|---|---|
| Organic Pigment | CIBA GEIGY | 3.0 |
| Phthalocyanine Blue Pigment 51.3 Flushed in Soya Bean Oil | Hilton Davis | 5.0 |
| Pigment 15:1 in Ameroxol OE-5 | Penn Color | 6 |
| Cab O Sil TS-720 | Cabot | 5 |
| Emollient (Arlamol E) | ICI | 51.5 |
| Polypropylene Glycol (Pluracol P-410) | BASF | 28.9 |
| Nonyl phenoxy polyoxyethylene ethanol (IGEPAL CO-210) | GAF | 2.3 |
| Nonyl phenoxy polyoxyethylene ethanol (IGEPAL CO-530) | GAF | 2.3 |
| Titonate Coupling Agent (Lica 38) | Kenrich | .3 |

Example VI - Red Ink

| Ingredient | Manufacturer | Wt. % |
|---|---|---|
| Microlith Yellow 2GT (≈33% and ≈67% rosin ester) | CIBA Geigy | 2.0 |
| MICROLITH SCARLETT R-t | " | .5 |
| Pigment Red 52:1 (20%) in Ameroxol OE-5 (80%) D-500 | Penn Color | 7.0 |
| Colorless triazine/aryl sulphonamide/formaldehyde resin (50%) in linseed oil (50%) | Lawter Int. | 14.0 |
| PLURACOL P-400 | BASF | 11.9 |
| IGEPAL CO-210 | GAF | 2.0 |
| IGEPAL CO-530 | " | 2.0 |
| Lica 38 | Kenrich | .3 |
| Arlamol E | ICI | 60.3 |

The above embodiments have been given by way of illustration only, and other embodiments of the instant invention will be apparent to those skilled in the art from consideration of the detailed description. Accordingly, limitations on the instant invention are to be found only in the claims.

What is claimed is:

1. A non aqueous dispersion ink composition, comprising:
    a) 40 to 90% by weight of a non aqueous continuing phase, comprising: 70–90% by weight emollient, 0.2–1 organic titanate coupling agent, and 10 to 30% polypropylene glycol, and
    b) 1–10% organic pigment having a particle size of 0.1 to 0.4 microns dispersed in rosin ester vehicle.

2. The non aqueous dispersion ink composition of claim 1 further including up to 10% by weight organic pigment flushed in a non-ionic surfactant.

3. The non aqueous dispersion ink composition of claim 2 further including 5 to 20% by weight triazine aryl sulphonamide paraformaldehyde resin dispersed in linseed oil alkyd resin.

4. The non aqueous dispersion ink composition of claim 1 wherein said non aqueous continuous phase further includes trace to 1% by weight surface tension modifier wherein said surface tension modifier is fumed silica with grafted polysiloxane groups.

5. The non aqueous dispersion ink composition of claim 1 wherein said non aqueous continuous phase further includes up to 5% by weight nonyl phenoxy polyoxyethylene ethanol.

6. The non aqueous dispersion ink composition of claim 1 wherein said non aqueous phase further includes up to 10% by weight alkyd resin wherein said alkyd resin is linseed oil resin.

7. The non aqueous dispersion ink composition of claim 1 wherein said emollient is stearylpolyoxy propylene ether.

8. A non aqueous dispersion ink composition comprising:
    a) 40 to 90% by weight low molecular weight solvent containing 70 to 90% by weight emollient and 10 to 30% by weight polypropylene glycol, and
    b) 1 to 10% by weight organic pigment having a particle size of 0.1 to 0.4 microns dispersed in a rosin ester vehicle.

9. The dispersion ink of claim 8 wherein said emollient is polyoxypropylene (10) cetyl ether.

10. A non aqueous dispersion ink composition comprising:
    a) 40 to 90% by weight solvent comprising 70 to 90% by weight emollient and 10 to 30% by weight polypropylene glycol,
    b) 1 to 10% by weight organic pigment dispersed in a vehicle,
    c) up to 5% by weight organic pigment flushed in a non-ionic surfactant, and
    d) 5 to 20% to weight triazine aryl sulphonamide paraformaldehyde resin dispersed in linseed oil resin.

11. The non aqueous dispersion ink composition of claim 10 further including 1 to 5% by weight of a first emulsifier having a hydrophilic lipophilic balance value of 2 to 4.9 and a second emulsifier having a hydrophilic lipophilic balance of 11 to 16.

12. The non aqueous dispersion ink composition of claim 11 wherein said organic pigment dispersed in a vehicle has a particle size of 0.1 to 0.4μ.

13. A non aqueous dispersion ink composition, comprising:
    a) 40 to 90% by weight of an non aqueous phase, comprising: 70 to 90% by weight non aqueous, fatty acid solvent and 0.2 to 1% by weight organic titanate coupling agent,
    b) 1–10% by weight organic pigment having a particle size 0.1 to 0.4 microns dispersed in rosin ester vehicle,
    c) up to 10% by weight organic pigment flushed in non-ionic surfactant, and d) 5 to 20% by weight triazine aryl sulphonamide paraformaldehyde resin dispersed in linseed oil alkyl resin.

14. The non aqueous dispersion ink composition of claim 13 wherein said non aqueous, fatty acid solvent is an emollient.

15. The non aqueous dispersion ink composition of claim 13 wherein said non aqueous, fatty acids solvent is stearyl polyoxypropylene ether.

16. The non aqueous dispersion ink composition of claim 13 wherein said non aqueous, fatty acids solvent is polyoxypropylene (10) cetyl ether.

17. The dispersion ink of claim 13 wherein said non aqueous, fatty acid solvent is selected from the group consisting of oleic acid, castor oil and soya bean oil.

* * * * *